United States Patent
Shimazu

(10) Patent No.: US 9,517,744 B2
(45) Date of Patent: Dec. 13, 2016

(54) VEHICLE OCCUPANT PROTECTION DEVICE

(71) Applicant: TOYOTA JIDOSHA KABUSHIKI KAISHA, Toyota-shi, Aichi-ken (JP)

(72) Inventor: Katsuya Shimazu, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/478,916

(22) Filed: Sep. 5, 2014

(65) Prior Publication Data
US 2015/0069741 A1    Mar. 12, 2015

(30) Foreign Application Priority Data
Sep. 9, 2013  (JP) ................. 2013-186372

(51) Int. Cl.
| | |
|---|---|
| *B60R 21/18* | (2006.01) |
| *B60R 21/233* | (2006.01) |
| *B60R 21/00* | (2006.01) |
| *B60R 21/261* | (2011.01) |

(52) U.S. Cl.
CPC ............. *B60R 21/18* (2013.01); *B60R 21/233* (2013.01); *B60R 2021/0004* (2013.01); *B60R 2021/0044* (2013.01); *B60R 2021/0048* (2013.01); *B60R 2021/0055* (2013.01); *B60R 2021/23324* (2013.01); *B60R 2021/2612* (2013.01)

(58) Field of Classification Search
CPC ...................................................... B60R 21/18
USPC ................................................... 280/733
See application file for complete search history.

(56) References Cited

U.S. PATENT DOCUMENTS

| | | | | |
|---|---|---|---|---|
| 5,062,662 | A * | 11/1991 | Cameron | 280/733 |
| 6,007,092 | A * | 12/1999 | Martz | 280/733 |
| 6,286,860 | B1 * | 9/2001 | Adomeit et al. | 280/733 |
| 2004/0178614 | A1 * | 9/2004 | Countryman et al. | 280/743.1 |
| 2005/0230945 | A1 * | 10/2005 | Watanabe | 280/733 |
| 2006/0028004 | A1 * | 2/2006 | Oota et al. | 280/733 |
| 2006/0119085 | A1 | 6/2006 | Masuda et al. | |
| 2006/0255573 | A1 | 11/2006 | Tobata et al. | |
| 2007/0013175 | A1 | 1/2007 | Suyama et al. | |
| 2009/0160166 | A1 | 6/2009 | Kataoka et al. | |
| 2009/0278340 | A1 | 11/2009 | Azuma et al. | |
| 2011/0248487 | A1 * | 10/2011 | Burczyk | B60R 21/239 280/742 |

FOREIGN PATENT DOCUMENTS

| | | |
|---|---|---|
| CN | 1895937 A | 1/2007 |
| DE | 1902793 A1 * | 8/1970 |
| DE | 9418721 U1 * | 8/1996 |
| EP | 0 901 943 A2 * | 3/1999 |
| EP | 1 743 810 A1 * | 1/2007 |

(Continued)

*Primary Examiner* — Ruth Ilan
(74) *Attorney, Agent, or Firm* — Oliff PLC

(57) ABSTRACT

A vehicle occupant protection device includes: a vehicle seat belt device containing a seat belt configured to restrain a occupant seating on a vehicle seat; an airbag which is provided on the seat belt in a folded state and in which the inside of an upper bag portion for restraining a head communicates with the inside of a lower bag portion for restraining a chest and an abdomen via a communicating portion; and an inflator which supplies gas into the lower bag portion when activated.

14 Claims, 9 Drawing Sheets

(56) References Cited

FOREIGN PATENT DOCUMENTS

| | | | |
|---|---|---|---|
| GB | 2368050 A | | 4/2002 |
| JP | H02-132555 U | | 11/1990 |
| JP | 10-100827 A | * | 4/1998 |
| JP | 2004-511390 A | | 4/2004 |
| JP | A-2004-511391 | | 4/2004 |
| JP | 2005-297917 A | | 10/2005 |
| JP | A-2006-44614 | | 2/2006 |
| JP | A-2006-160062 | | 6/2006 |
| JP | A-2006-298052 | | 11/2006 |
| JP | 2007-022212 A | | 2/2007 |
| JP | 2009-149196 A | | 7/2009 |
| JP | A-2009-269538 | | 11/2009 |
| JP | 2012-056345 A | | 3/2012 |
| JP | 2012-056380 A | | 3/2012 |
| WO | 02/32726 A1 | | 4/2002 |
| WO | WO 02/32727 A1 | | 4/2002 |

* cited by examiner

VEHICLE OCCUPANT PROTECTION DEVICE

INCORPORATION BY REFERENCE

The disclosure of Japanese Patent Application No. 2013-186372 filed on Sep. 9, 2013 including the specification, drawings and abstract is incorporated herein by reference in its entirety.

BACKGROUND OF THE INVENTION

1. Field of the Invention

The present invention relates to a vehicle occupant protection device which protects an occupant by using an airbag provided on a seat belt upon a vehicle collision.

2. Description of Related Art

FIG. 1 of Japanese Patent Application Publication No. 2006-044614 (JP 2006-044614 A) illustrates a occupant protection device which includes an upper airbag which is accommodated in a shoulder belt and to be inflated and expanded in the vicinity of a occupant's head and a lower airbag which is accommodated in a lap belt and to be inflated and expanded between the upper airbag and occupant's thighs. The upper and lower airbags are separate from each other and upon a front collision of a vehicle, are supplied with gas individually from an inflator so that they are inflated and expanded at the same time. In this occupant protection device, a occupant's head is restrained earlier by the upper airbag which is inflated and expanded from the shoulder belt upon the front collision.

Further, FIG. 5 of the JP 2006-044614 A illustrates a occupant protection device provided with the airbag which is accommodated in the shoulder belt and to be inflated and expanded between the head and the thighs. This airbag is formed by partitioning a single bag to an upper airbag and a lower airbag with a partition wall and gas from an inflator is supplied to the upper airbag. When the internal pressure of the upper airbag is increased as a result, gas flows into the lower airbag via a one-way valve provided on the partition wall. In this occupant protection device also, the occupant's head is restrained earlier by the upper airbag of the airbag which is inflated and expanded from the shoulder belt at the time of a front collision.

By the way, after the upper half of the occupant's body which is about to be inclined forward by the inertia force at the time of the front collision of the vehicle is retrained by the lower airbag and the shoulder belt as described above, the occupant's head is inclined forward relative to the chest and the like. If the forward inclining timing of the head and the inflation/expansion timing of the upper airbag described above deviate from each other largely, it can be considered that the upper airbag may interfere with the head carelessly.

SUMMARY OF THE INVENTION

The present invention provides a vehicle occupant protection device capable of preventing an airbag being inflated and expanded from a seat belt from interfering with the head of an occupant carelessly.

An aspect of the present invention relates to a vehicle occupant protection device. The vehicle occupant protection device includes a vehicle seat belt device containing a seat belt configured to restrain an occupant seating on a vehicle seat; an airbag which is provided on the seat belt in a folded state and in which the inside of an upper bag portion for restraining the head communicates with the inside of a lower bag portion for restraining the chest and the abdomen via a communicating portion; and an inflator which supplies gas into the lower bag portion when activated.

According to the above aspect, for example, if a vehicle undergoes a front collision, the inflator is activated. Then, in the airbag provided on the seat belt in the folded state, gas is supplied into the lower bag portion configured to restrain the chest and the abdomen. The gas supplied into the lower bag portion is supplied to the upper bag portion configured to restrain the head via the communicating portion of the airbag. As a result, the upper bag portion begins to be inflated and expanded behind the lower bag portion. When the lower bag portion is compressed by the chest and the abdomen of the occupant being inclined forward due to the inertia force, gas further flows into the upper bag portion. As a result, it is possible to bring a timing when, after the chest and the abdomen being inclined forward as described above are restrained (decelerated) by the seat belt and the lower bag portion, the head of the occupant begins to be inclined forward relative to the chest and the like close to a timing when the inflation and expansion of the upper bag portion is completed. Consequently, the head can be restrained favorably by the upper bag portion and at the same time, the upper bag portion of the airbag can be suppressed from interfering with the head carelessly. In the meantime, the above-described aspect includes a case where an upper portion of the chest is restrained by an lower portion of the upper bag portion configured to restrain the head.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

<First Embodiment>

Figure 1:
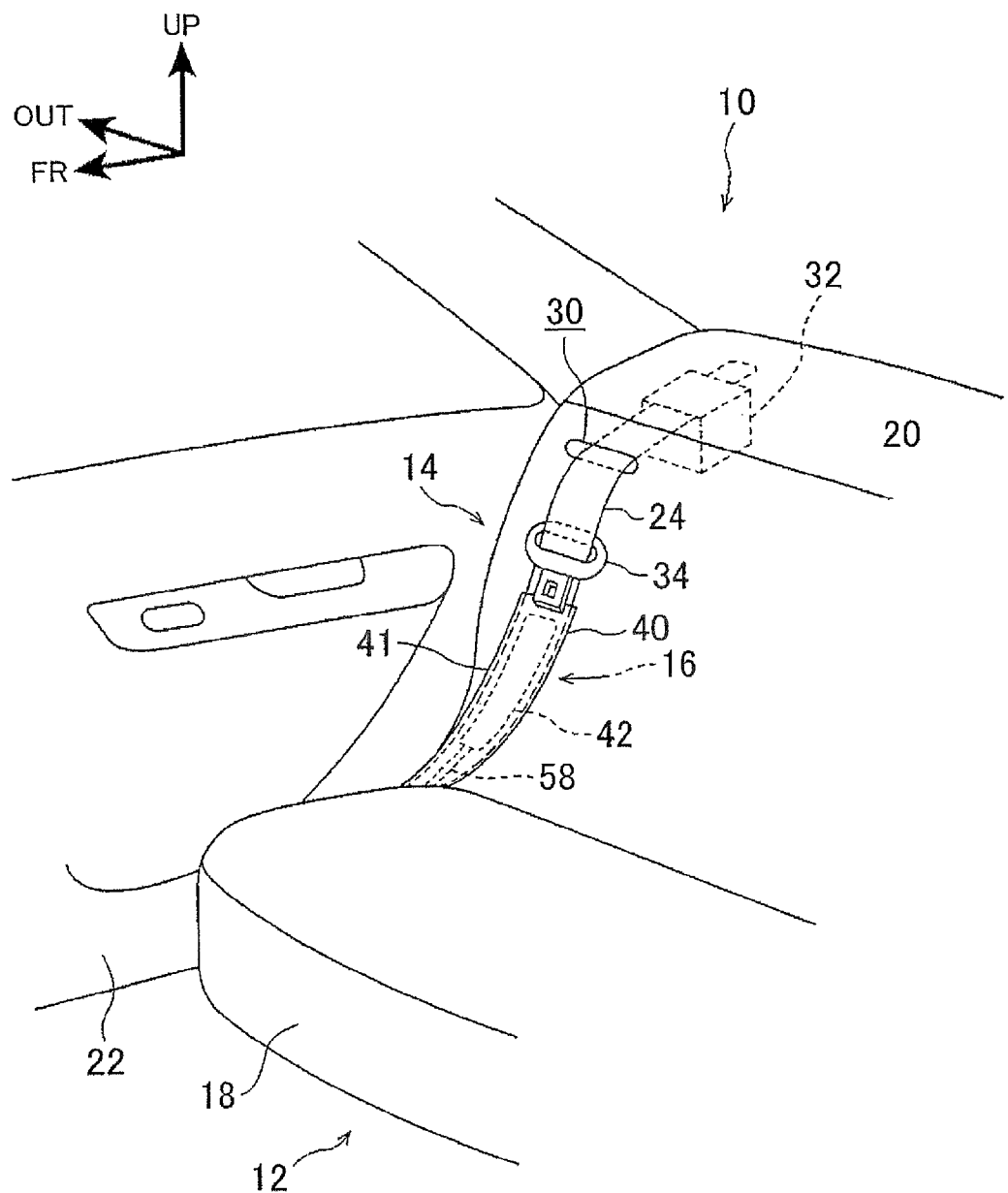
FIG. 1 is a perspective view showing the structure of the surrounding of a rear seat including part thereof provided with a vehicle occupant protection device according to a first embodiment of the present invention.

A vehicle occupant protection device 10 according to the first embodiment of the present invention will be described with reference to FIGS. 1 to 6. An arrow FR, an arrow UP, and an arrow OUT marked as required in each drawing indicate forward of a vehicle (advance direction), upward of the vehicle and outward in the vehicle width direction, respectively. In following descriptions using just the longitudinal direction, the right-left direction or the up-and-down direction, unless specified otherwise, it is assumed that they indicate front and rear in the vehicle front-rear direction, right and left in the vehicle right-left direction (vehicle width direction) and up and down in the vehicle up-down direction respectively.

(Structure)

As shown in FIGS. 1 to 5, the vehicle occupant protection device 10 is provided on a rear seat 12 (vehicle seat) of a vehicle and includes a vehicle seat belt device 14 and an airbag device 16. The rear seat 12 includes a seat cushion 18 on which an occupant P (not shown in FIG. 1) is seating and a seat back 20 which serves as a backrest for the occupant P. Reference numeral 22 in FIG. 1 indicates a rear side door of the vehicle.

It is assumed that the vehicle seat belt device 14 is a three-point type seat belt device (vehicle three-point type seat belt device) and it has a long-strip shaped seat belt 24 (webbing) configured to restrain an occupant seating on the rear seat 12. An end portion in the longitudinal direction of the seat belt 24 is latched onto an anchor member 28 (not shown except in FIG. 5) fixed to a vehicle floor 26 outside with respect to the seat cushion 18 in the vehicle width direction. The end portion in the longitudinal direction of the seat belt 24 is latched to the vehicle body via this anchor member 28.

The other end portion in the longitudinal direction of the seat belt 24 is inserted into a slit-shaped opening 30 formed at an upper end portion of an outside end portion of the seat back 20 in the vehicle width direction and extends backward of the opening 30. A retractor 32 (webbing winding device) is arranged in the back of the opening 30. The retractor 32 is fixed to an upper back panel (not shown), for example. The other end portion in the longitudinal direction of the seat belt 24 is latched onto a winding shaft of the retractor 32. The seat belt 24 is urged in the winding direction of the retractor 32 and when the occupant P is not wearing the seat belt 24 (hereinafter, this state is called belt non-wearing condition), it is stretched substantially vertically between the anchor member 28 and the opening 30 (see FIG. 1).

A tongue plate 34 is mounted slidably to an intermediate portion in the longitudinal direction of the seat belt 24. In the belt non-wearing condition, a stopper (not shown) attached to the seat belt 24 and the tongue plate 34 make contact with each other so that the tongue plate 34 is held below and in the vicinity of the opening 30. The tongue plate 34 is connectable to a buckle device 36 provided on a central side of the seat cushion 18 in the vehicle width direction. The buckle device 36 is connected to a frame (not shown) equipped on the seat cushion 18 or the vehicle floor 26 via a stay 38.

In the vehicle seat belt device 14 having the above-described structure, the occupant P seating on the rear seat 12 wears the seat belt 24 on his or her upper body and connects the tongue plate 34 to the buckle device 36. As a result, the occupant P turns into a state of wearing the seat belt 24 (hereinafter, called belt wearing condition). Under the belt wearing condition, a portion between the tongue plate 34 and the retractor 32 of the seat belt 24 acts as a shoulder belt 24A (shoulder belt portion) which restrains the upper body (shoulder S, chest C and abdomen B) of the occupant P. Further, under the belt wearing condition, a portion between the tongue plate 34 and the anchor member 28 of the seat belt 24 acts as a lap belt 24B (waist belt portion) which restrains the waist L of the occupant P.

Figure 6:
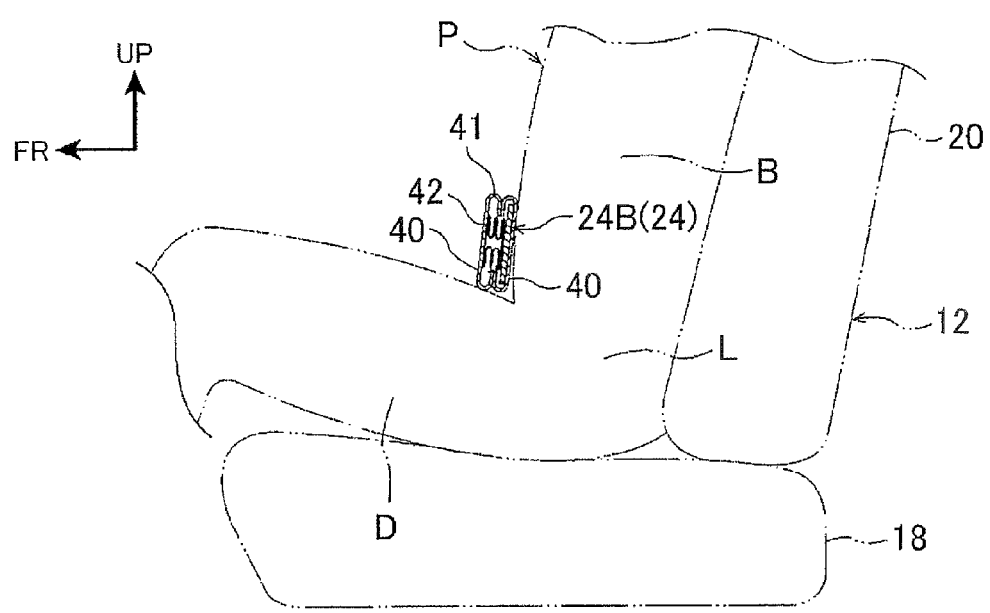
FIG. 6 is a sectional view showing a section taken along the line VI-VI in FIG. 5.

The intermediate portion in the longitudinal direction of the aforementioned lap belt 24B is inserted into the inside of a cover 41 (not shown in FIGS. 2 to 4) which is sewed into a cylindrical shape. As shown in FIG. 6, the cover 41 is produced by sewing long side edges of a pair of belt-like members 40 together such that they are overlapped with each other. An airbag 42 (bag body) which is a component of the airbag device 16 is held inside the cover 41. On the lap belt 24B, this airbag 42 is attached to a face which is located in front of the waist L and directed to an opposite side to the waist L under the belt wearing condition. In the meantime, in the lap belt 24B, a portion located in front of the waist L under the belt wearing condition may be formed into a cylindrical shape and the airbag 42 may be held inside the cylindrical portion (inside the lap belt 24B). In this case, for example, two-divided portions of the seat belt 24 are sewed to both end portions of a cylindrically formed connecting body, so that they are connected. In addition, the arrangement structure of the airbag 42 on the lap belt 24B (seat belt 24) can be changed as required.

The airbag device 16 according to the present embodiment is constituted of mainly the aforementioned airbag 42 and an inflator 46 (gas generating device) configured to supply gas into the airbag 42. The airbag 42 is held inside the cover 41 in a folded state. In the belt non-wearing condition, the airbag 42 is arranged in the lap belt 24B such that it is located between the tongue plate 34 and the seat cushion 18 as shown in FIG. 1.

The airbag 42 is inflated and expanded forward of the upper body of the occupant P by a pressure of gas supplied from the inflator 46. When the inflation and expansion occurs, the above-described cover 41 is broken by receiving an inflation pressure of the airbag 42. If a structure which holds the airbag 42 inside the cylindrically formed portion of the lap belt 24B is adopted, a breakage portion provided on the lap belt 24B is broken by receiving an inflation pressure of the airbag 42 when the airbag 42 is inflated and expanded. The front and rear direction and the up and down direction of the airbag 42 described in a following description indicate directions when the airbag 42 is inflated and expanded unless otherwise specified, and substantially coincide with the front and rear direction and the up and down direction of the vehicle.

Figure 2:
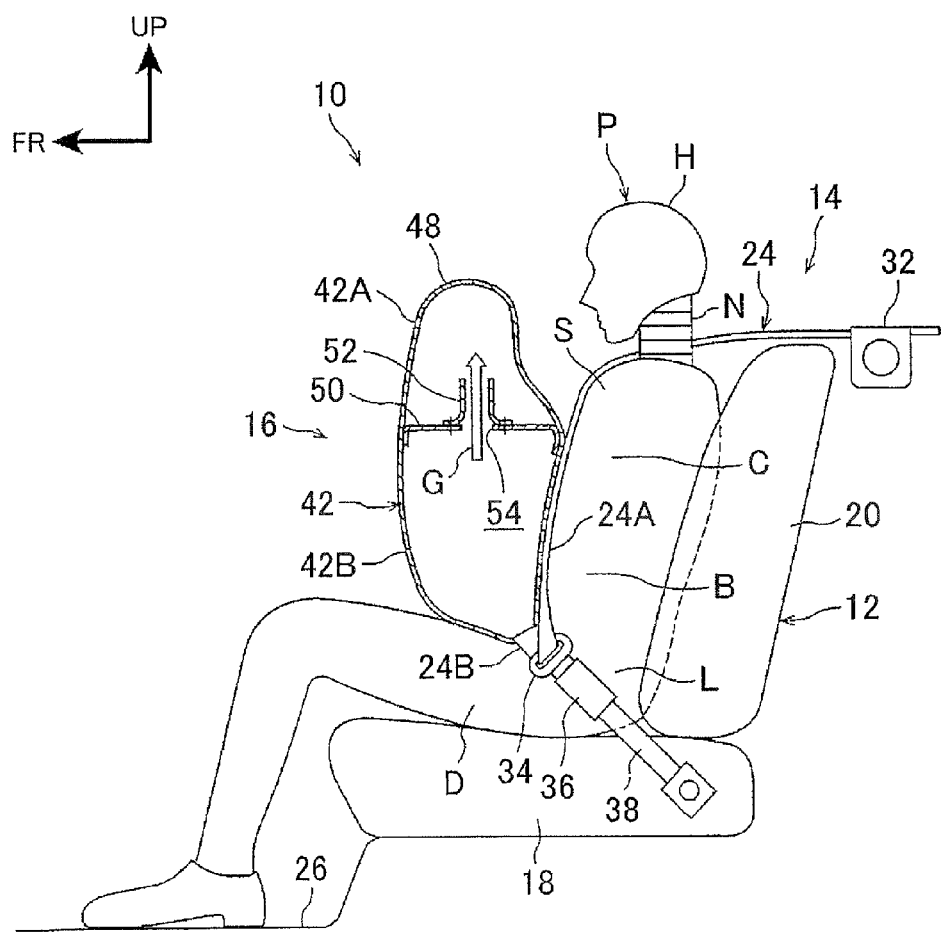
FIG. 2 is a side view showing a state in which the airbag of the vehicle occupant protection device according to the first embodiment of the present invention provided on the seat belt begins to be inflated and expanded.
Figure 3:
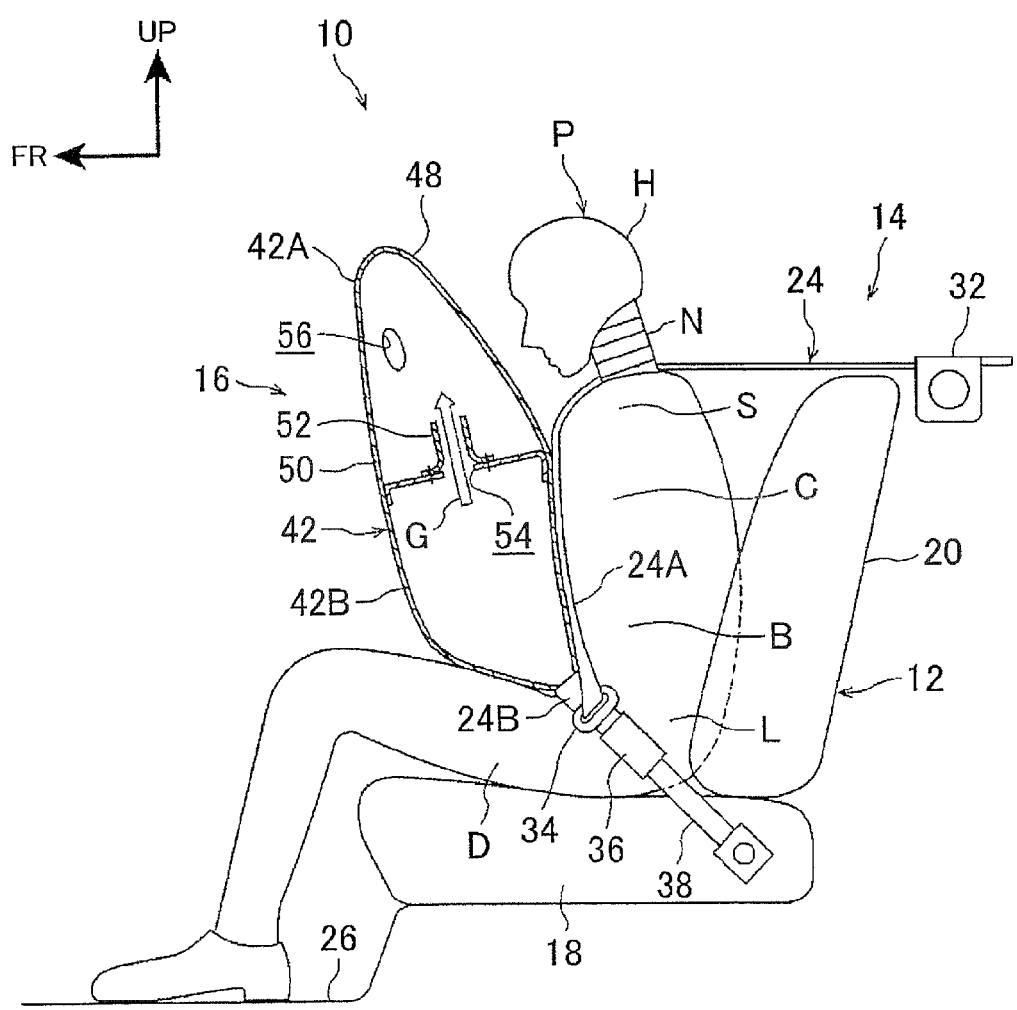
FIG. 3 is a side view, corresponding to FIG. 2, showing a state of the initial period of occupant restraining by means of the airbag according to the first embodiment of the present invention, illustrating a state in which the inflation/expansion of the upper bag portion included by the airbag is completed.
Figure 4:
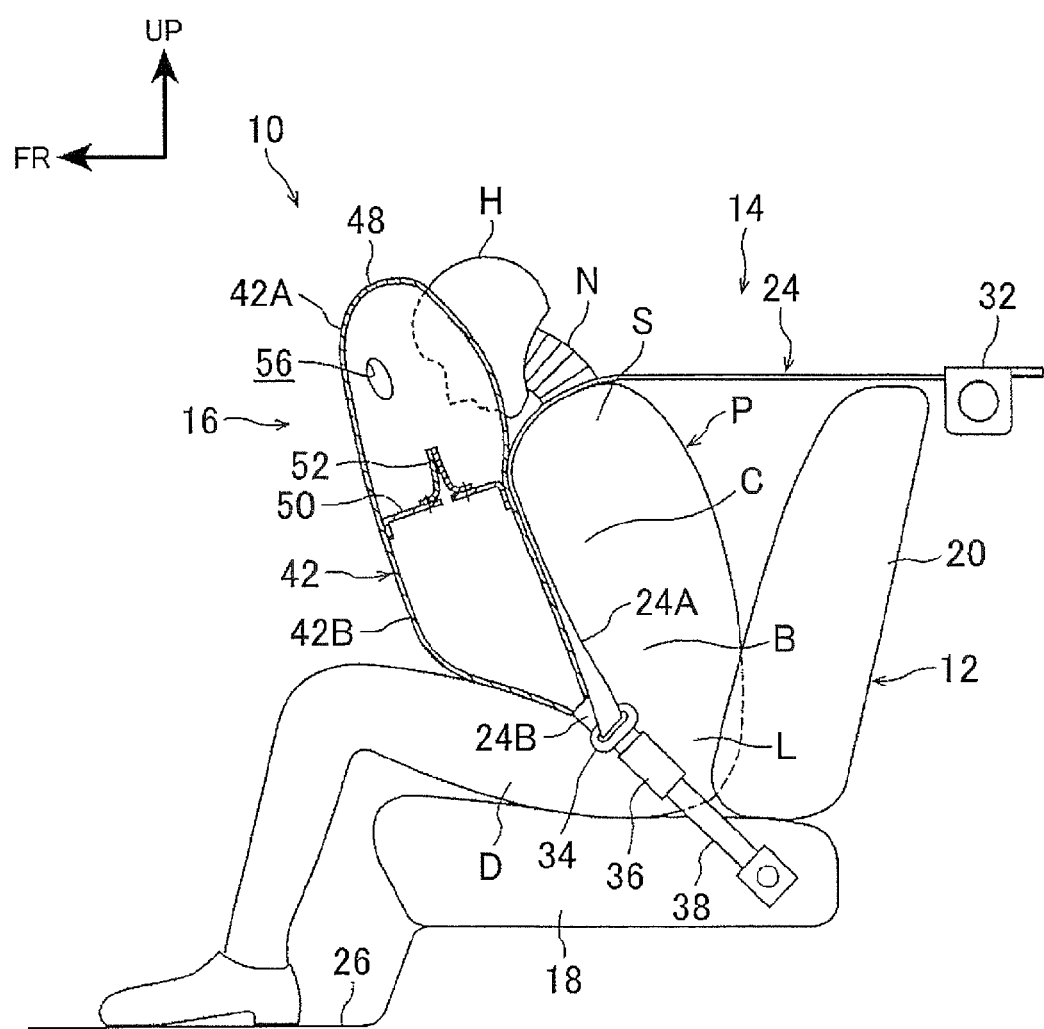
FIG. 4 is a side view, corresponding to FIG. 2, illustrating a state of the latter period of occupant restraining by the airbag according to the first embodiment of the present invention.

As shown in FIGS. 2 to 4, the airbag 42 is a twin-chamber airbag whose inside is partitioned to upper and lower portions. The airbag 42 is constituted of a bag body 48, a up-and-down-partitioning cloth 50 (up-and-down-partitioning portion) which partitions the inside of the bag body 48 and a check valve 52 (one-way valve) attached to the vertically-partitioning cloth 50. The bag body 48 is formed into a long bag structure by sewing, for example, nylon-base or polyester-base fabric material (foundation fabric). When the inflation and expansion completion state is seen in a side view as shown in FIG. 3, the bag body 48 is formed such that its longitudinal direction is along the up-and-down direction of the vehicle and set in such a size as capable of restraining the occupant P from the head H to the abdomen B.

On the other hand, the up-and-down-partitioning cloth 50 is formed with the same fabric material as the material of the bag body 48 and sewed to the inside of the bag body 48. The up-and-down-partitioning cloth 50 partitions the airbag 42 to an upper bag portion 42A and a lower bag portion 42B. The lower bag portion 42B is adapted to restrain the chest and the abdomen, so that it is inflated and expanded in front of the chest C and the abdomen B of the occupant P. The upper bag portion 42A is adapted to restrain the head so that it is inflated and expanded in front of the head of the occupant P. As shown in FIG. 3, the upper bag portion 42A is formed such that it is inclined forward of the vehicle as a face opposing the head H rises upward of the vehicle when the inflation and expansion completion state is viewed in the vehicle width direction. In the meantime, the lower bag portion 42B is formed such that, for example, in the inflation and expansion completion state, its top portion is located at a height of the chest of AF05 (5 percentile adult women of US).

A communication hole 54 (opening) is formed at the central portion of the aforementioned up-and-down-partitioning cloth 50. The check valve 52 capable of opening/closing the communication hole 54 is attached to the central portion of the up-and-down-partitioning cloth 50. The communication hole 54 and the check valve 52 constitute a communicating portion which communicates the inside of the upper bag portion 42A with the inside of the lower bag portion 42B. The check valve 52 is formed into a cylindrical shape by sewing with the same fabric material as the material of the bag body 48 and an end portion thereof in the axial direction thereof is sewed to an edge portion of the communication hole 54 in the up-and-down-partitioning cloth 50. The check valve 52 is projected into the upper bag portion 42A and allows a flow of gas from the lower bag portion 42B to the upper bag portion 42A (see an arrow G in FIGS. 2 and 3). In addition, as shown in FIG. 4, the check valve 52 is crushed by an internal pressure of the upper bag portion 42A so as to limit the flow of gas from the inside of the upper bag portion 42A to the inside of the lower bag portion 42B. This limitation includes reduction of gas flow as well as complete shut-down of the gas flow.

Further, a vent hole 56 (not shown except in FIGS. 3 and 4) for discharging out gas supplied to the inside is formed at a portion of the upper bag portion 42A facing outward in the vehicle width direction in the inflation and expansion completion state. The inside of the upper bag portion 42A communicates with the outside of the airbag 42 via the vent hole 56. In the meantime, if a curtain airbag which is inflated and expanded downward from an end portion of the ceiling of a vehicle compartment in the vehicle width direction or a side airbag which is inflated and expanded forward from a side portion of the seat back 20 is provided on the vehicle, it is necessary to set up a portion in which the vent hole 56 is to be formed corresponding to that. That is, if the curtain airbag or the side airbag is inflated and expanded at the same time as the airbag 42, it is necessary to set up the portion in which the vent hole 56 is to be formed so that the vent hole 56 is not clogged by the curtain airbag or the side airbag.

Figure 5:
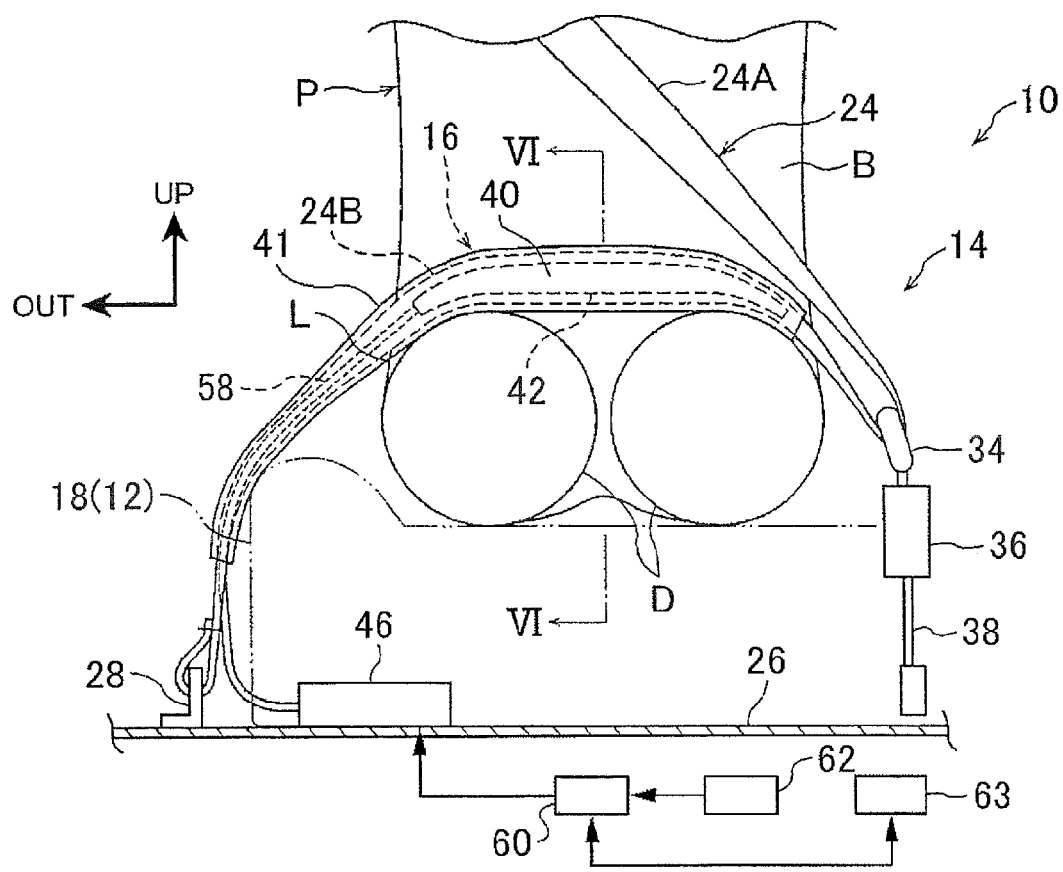
FIG. 5 is a front view showing the structure of the surrounding of the seat belt according to the first embodiment of the present invention including its lap belt.

On the other hand, as shown in FIG. 5, the inflator 46 is fixed to the vehicle floor 26 in the vicinity of the anchor member 28. An end portion of a flexible tube 58 (gas passage) placed inside the cover 41 along the lap belt 24B is connected to a gas injection port of the inflator 46. The flexible tube 58 extends from the anchor member 28 side to the lower bag portion 42B along the lap belt 24B while the other end portion thereof is connected to the lower bag portion 42B. The inside of the lower bag portion 42B communicates with the gas injection port of the inflator 46 via the flexible tube 58. As a consequence, gas injected from the gas injection port of the inflator 46 is supplied into the lower bag portion 42B.

An ECU 60 (control unit) which is mounted on the vehicle is connected electrically to the aforementioned inflator 46. A collision detection unit 62 which includes a front-rear acceleration sensor for detecting an acceleration in the front and rear direction of the vehicle and a right-left acceleration sensor for detecting an acceleration in the right and left direction of the vehicle is connected electrically to the ECU 60. A buckle sensor 63 for detecting that the tongue plate 34 is connected to the buckle device 36 is connected electrically to the ECU 60.

The ECU 60 determines whether the occupant P wears the seat belt 24 according to a signal from the buckle sensor 63. Further, the ECU 60 determines whether the vehicle has undergone a front collision according to a signal from the collision detection unit 62. If all these determinations are made affirmatively, the inflator 46 is actuated by the ECU 60. The front collision mentioned here includes not only full-wrap front collision (symmetrical collision) but also offset collision, oblique collision and minute-wrap collision (both, asymmetrical collision).

In the meantime, instead of the buckle sensor 63, the ECU 60 may be configured to determine whether the occupant P wears the belt using a pull-out amount sensor for detecting a pull-out amount of the seat belt 24 from the retractor 32 or a tension sensor for detecting a tension applied to the seat belt 24. Further, if a pre-crush sensor for predicting (estimating) a front collision is connected electrically to the ECU 60, the ECU 60 may be configured to determine whether the front collision is avoidable based on a signal from the pre-crush sensor. Further, the collision detection unit 62 may be configured to include a pair of the front-rear acceleration sensors (right and left) mounted on right and left front side members or the like. In this case, the ECU 60 is configured to distinguish between the symmetrical collision and the asymmetrical collision by comparing a deviation in the input timing of signals from the right and left front-rear acceleration sensors with the magnitude of an output signal from each of the front-rear acceleration sensors. In addition, the structure of peripheral components concerned with the operation control of the airbag device 16 can be changed appropriately.

(Operation and Effect)

Next, an operation and an effect of the first embodiment will be described.

In the vehicle occupant protection device 10 having the above-described structure, if the ECU 60 detects a front collision in a state in which the occupant P wears the seat belt 24 and the vehicle is traveling, the inflator 46 is activated. Then, in the airbag 42 provided on the seat belt 24 in the folded state, gas is supplied to the lower bag portion 42B configured to restrain the chest and the abdomen. Gas supplied into the lower bag portion 42B is supplied into the upper bag portion 42A configured to restrain the head via the communication hole 54 and the check valve 52 of the up-and-down-partitioning cloth 50. Then, as shown in FIG. 2, the upper bag portion 42A begins to be inflated and expanded behind the lower bag portion 42B.

When the lower bag portion 42B is compressed by the chest C and the abdomen B of the occupant P who is inclined forward by inertia force, gas further flows into the upper bag portion 42A. As a result, as shown in FIG. 3, the inflation and expansion of the upper bag portion 42A is completed. The inflation and expansion completion timing of the upper bag portion 42A is close to a timing when the head H of the occupant P is inclined forward relative to the chest C and the like after the forward inclined chest C and abdomen B are restrained (decelerated) by the seat belt 24 and the lower bag portion 42B. As a result, as shown in FIG. 4, the head H can be restrained favorably by the upper bag portion 42A while the upper bag portion 42A can be suppressed from interfering with the head H carelessly (at an unexpected timing). As a result, the head H and the neck N of the occupant P can be protected favorably.

Further, according to the present embodiment, in the three-point type seat belt device, the airbag 42 is provided on the lap belt 24B of the seat belt 24. Because the displacement of the lap belt 24B is smaller than that of the shoulder belt 24A at the time of a front collision, it can stabilize an expansion direction of the airbag 42. Thus, this can contribute further to suppressing the airbag 42 from interfering with the head H carelessly.

Further, in the present embodiment, gas from the inflator 46 is supplied into the lower bag portion 42B via the flexible tube 58 (gas passage) from an end portion side in the longitudinal direction of the lap belt 24B latched onto the anchor member 28. With such a structure, the structure of the gas passage for supplying gas from the inflator 46 to the airbag 42 can be simplified.

That is, in the three-point type vehicle seat belt device 14, the tongue plate 34 to be connected detachably to the buckle device 36 is attached slidably to an opposite side (other end side in the longitudinal direction) to the anchor member 28 of the lap belt 24B. If the gas passage is provided on such a portion, the structure of the gas passage is complicated. In this respect, because according to the first embodiment of the present invention, gas is supplied to the airbag 42 in the lap belt 24B from an end portion side in the longitudinal direction of the lap belt 24B which is latched onto the vehicle body via the anchor member 28, the structure of the gas passage can be simplified.

In the meantime, if the airbag is provided on the shoulder belt 24A, gas must be supplied to the airbag from the buckle device 36 side or the retractor 32 side. In a case where gas is supplied to the airbag in the shoulder belt 24A from the buckle device 36 side, the structure of the gas passage is also complicated as described above. Further, if gas is supplied to the airbag in the shoulder belt 24A from the retractor 32 side, the structure of the gas passage is complicated because the gas passage must be set up at a portion in which the seat belt 24 is wound up or pulled out with respect to the retractor 32.

In this respect, because in the present embodiment, gas is supplied to the airbag 42 in the lap belt 24B from the anchor member 28 side as described above, the structure of the gas passage can be simplified extremely.

Further, in a case where the airbag 42 is provided on the lap belt 24B which contacts the waist L, a feeling of discomfort (feeling of stiffness or the like) which is given to the occupant P can be reduced compared to a case where the airbag is provided on the shoulder belt 24A which contacts the chest C and the abdomen B or the like.

Further, in the present embodiment, the check valve 52 is attached to the up-and-down-partitioning cloth 50 of the airbag 42. The check valve 52 allows a flow of gas from the inside of the lower bag portion 42B to the inside of the upper bag portion 42A and limits the flow of gas from the inside of the upper bag portion 42A to the inside of the lower bag portion 42B (see FIG. 4). The internal pressure of the upper bag portion 42A can be held by the check valve 52. As a result, because the shape of the upper bag portion 42A in the inflation and expansion completion state can be held, the restraining performance for the head H by the upper bag portion 42A can be improved.

Further, in the present embodiment, the upper bag portion 42A is provided with the vent hole 56 for discharging out the gas supplied to the inside thereof. As a result, this can suppress the internal pressure of the upper bag portion 42A from increasing excessively. In addition, the vent hole 56 is provided at a portion of the upper bag portion 42A facing outward in the vehicle width direction in the inflation and expansion completion state. This can suppress gas from being discharged to an adjacent occupant on the rear seat 12 and to the side of occupants on the front seat.

Next, other embodiment of the present embodiment will be described. In the meantime, as regards basically the same structure and operation as the first embodiment, the same reference numerals to the first embodiment are attached and description thereof is omitted.

<Second Embodiment>

Figure 7:
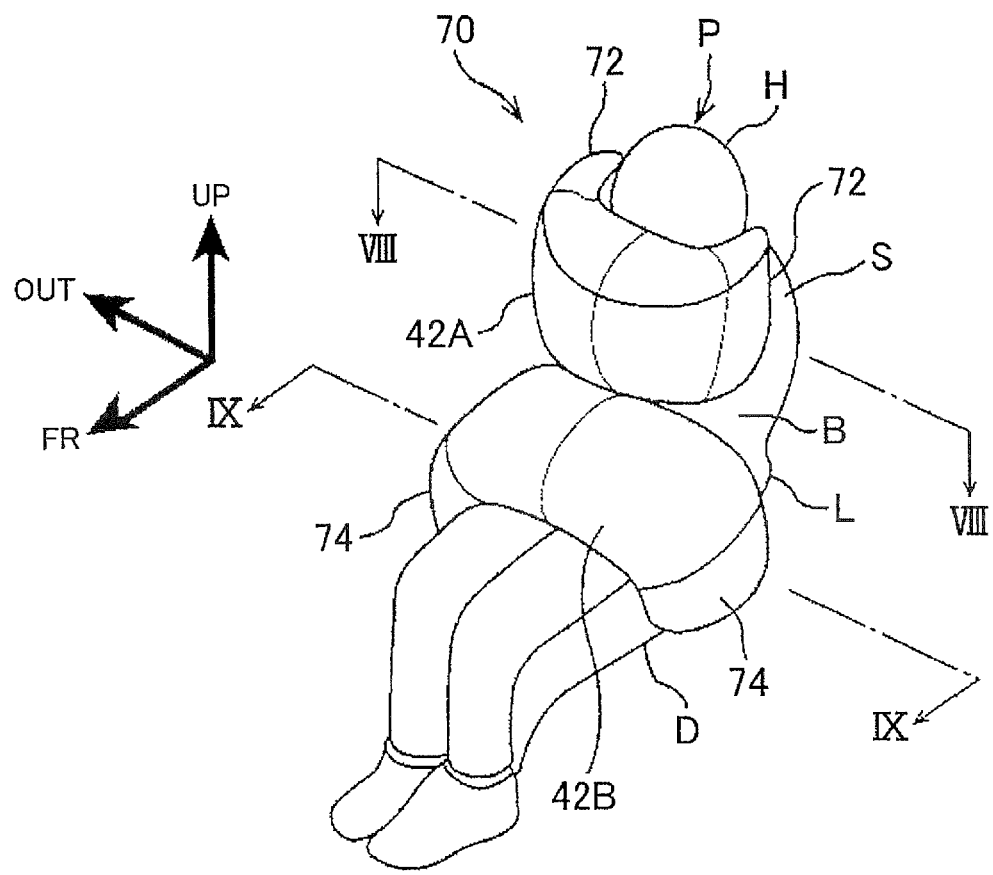
FIG. 7 is a perspective view showing a state of occupant restraining by the airbag of a vehicle occupant protection device according to a second embodiment of the present invention.

FIG. 7 shows a state of occupant restraining by an airbag 70 of a vehicle occupant protection device according to the second embodiment of the present invention through a perspective view. The airbag 70 is different from the airbag 42 of the first embodiment in that it includes a pair of backward projecting portions 72 (right and left) provided on the upper bag portion 42A and a pair of downward projecting portions 74 (right and left) provided on the lower bag portion 42B.

Figure 8:
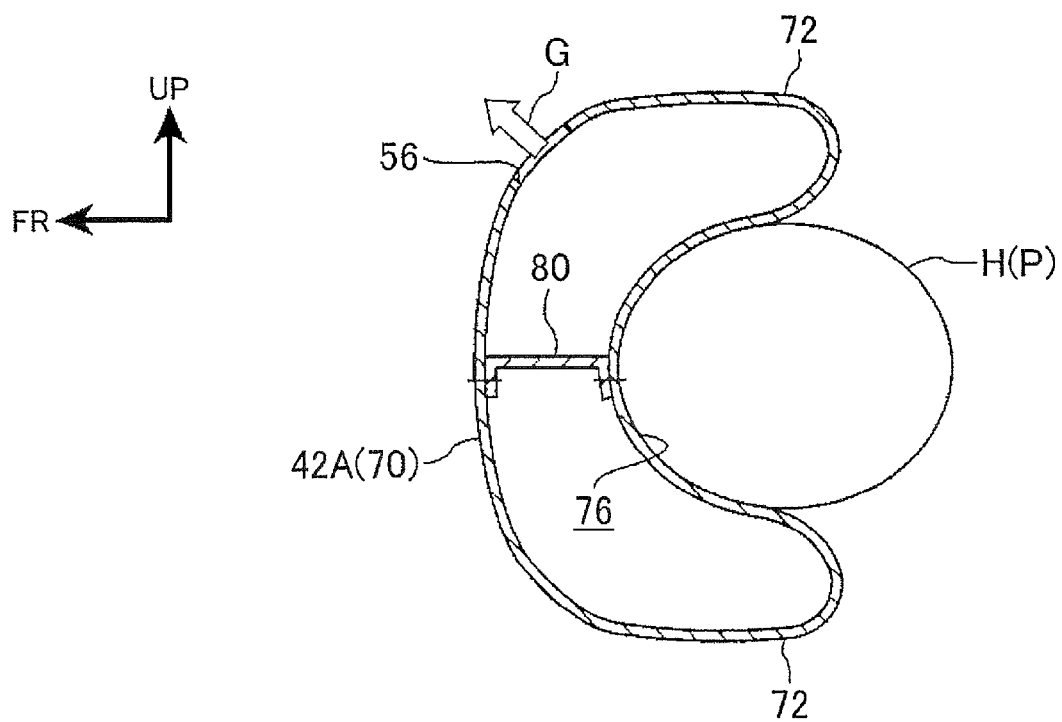
FIG. 8 is an enlarged sectional view showing a section taken along the line VIII-VIII in FIG. 7 by magnifying.
Figure 9:
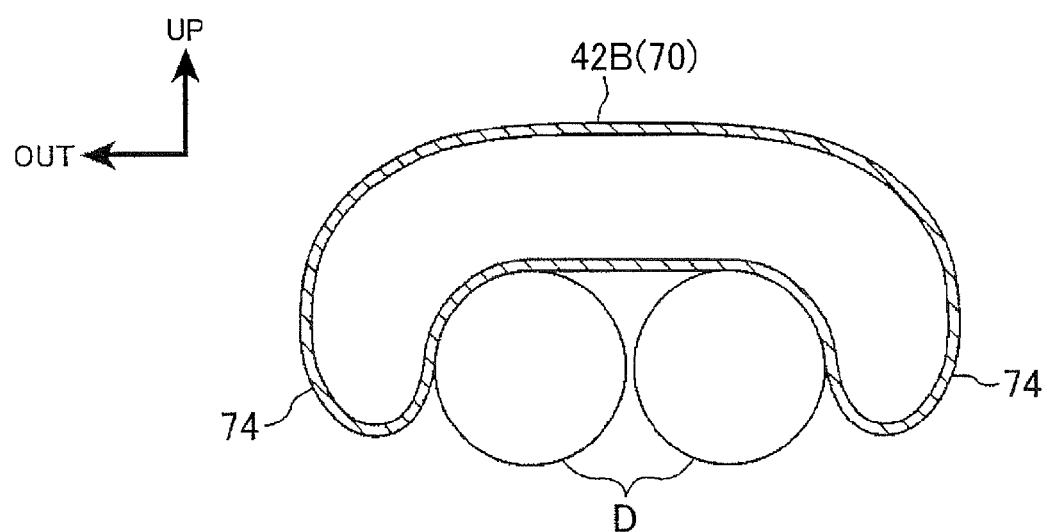
FIG. 9 is an enlarged sectional view showing a section taken along the line IX-IX in FIG. 7 by magnifying.

As shown in FIG. 8, when the upper bag portion 42A is inflated and expanded, the right and left backward projecting portions 72 project backward of the vehicle from both side portions of the upper bag portion 42A in the vehicle width direction. As a result, a concave portion 76 which defines concavity in the forward direction of the vehicle as seen in a plan view is formed at the central portion of a face on the vehicle back side of the upper bag portion 42A in the vehicle width direction. The concave portion 76 is set up in such a size in the vehicle width direction which allows the head H of the occupant P to be accepted. In the meantime, an arrow G marked in FIG. 8 indicates a discharge direction of gas discharged from the vent hole 56. In the present embodiment, a tether 80 configured to restrict expansion of the central portion in the width direction of the upper bag portion 42A is attached to the central portion in the width direction inside the upper bag portion 42A. If the shape of the upper bag portion 42A as shown in FIG. 8 can be secured by setting the shape of a foundation fabric of the upper bag portion 42A, the tether 80 may be omitted.

When the lower bag portion 42B is inflated and expanded, the right and left downward projecting portions 74 project downward of the vehicle from both side portions of the lower bag portion 42B in the vehicle width direction. As a result, a concave portion 78 which defines concavity toward the vehicle upward side as viewed in the front-rear direction of the vehicle is formed at a central portion of a face of the lower bag portion 42A on the vehicle downward side in the vehicle width direction. The concave portion 78 is set up in such a size in the vehicle width direction which allows the right and left thighs D of the occupant P to be accepted.

In the present embodiment, the structure other than described above is the same as the first embodiment. Thus, the present embodiment also can secure basically the same operation and effect as the first embodiment. Further, in the present embodiment, at the time of the front collision of the vehicle, the head H is fitted to the concave portion 76 of the inflated and expanded upper bag portion 42A and at the same time, the thighs D are fitted to the concave portion 78 of the inflated and expanded lower bag portion 42B. With such a condition, the head H can be supported by the right and left backward projecting portions 72 from sideways and the thighs D can be supported by the right and left downward projecting portions 74 from sideway. Consequently, even in a case of a collision type in which the obliquely forward inertia force is applied to the occupant P like asymmetrical collision, lateral displacement of the head H relative to the upper bag portion 42A and lateral displacement of the thighs D (finally the waist L) relative to the lower bag portion 42B can be prevented or suppressed.

<Supplementary Explanation of the Embodiments>

Although each of the above-described embodiments is so constructed that the upper bag portion 42A is provided with the vent hole 56, the present invention is not restricted to this example but unless the internal pressure of the upper bag portion 42A increases excessively due to an output of the inflator 46 or the like, the vent hole 56 may be omitted.

Further, although each of the above-described embodiments is so constructed that each of the airbags 42 and 70 is provided with the check valve 52, the present invention is not restricted to this example but if pressure balance between the upper bag portion 42A and the lower bag portion 42B is autonomously secured, the check valve 52 may be omitted.

Further, although each of the above-described embodiments is so constructed that the inflator 46 supplies gas to the inside of the lower bag portion 42B via the flexible tube 58 (gas passage) from the anchor member 28 side, the present invention is not restricted to this example. That is, the inflator 46 may be constructed to supply gas into the lower bag portion 42B via the gas passage from the buckle device 36 side.

Further, although in each of the above-described embodiments, the vehicle seat belt device 14 is of three-point type, the present invention is not restricted to this example but the vehicle seat belt device may be of four-point type or six-point type.

Further, although in each of the above-described embodiments, the airbag 42 is provided on the lap belt 24B, the present invention is not restricted to this example but the airbag 42 may be provided on the shoulder belt 24A. In this case, the airbag is arranged at a portion located in front of (on the front side of) the abdomen B under the belt wearing condition of the shoulder belt 24A, for example.

Further, although in each of the above-described embodiments, the airbag 42 is partitioned to two bag portions, i.e., the upper bag portion 42A and the lower bag portion 42B, the present invention is not restricted to this example. For example, it is permissible to provide an intermediate bag portion between the upper bag portion and the lower bag portion. In this case, the inside of the upper bag portion and the inside of the intermediate bag portion communicate with each other via an upper communication hole provided in an upper partition between the upper bag portion and the intermediate bag portion. In addition, the inside of the intermediate bag portion and the inside of the lower bag portion communicate with each other via a lower communication hole provided in a lower partition between the intermediate bag portion and the upper bag portion. That is, in this case, the upper communication hole, the intermediate bag portion and the lower communication hole act as a communicating portion which communicates the inside of the upper bag portion with the inside of the lower bag portion.

Further, although in the first embodiment, the vehicle occupant protection device 10 is constructed for the rear seat 12, the present invention is not restricted to this example but the vehicle occupant protection device may be constructed for a front seat. In this respect, the same thing can be said of the second embodiment also.

The present invention may be modified in various ways within a range not departing from a spirit thereof and executed. Needless to say, the scope of right of the present invention is not restricted to each of the above-described embodiments.

What is claimed is:

1. A vehicle occupant protection device comprising:
   a vehicle seat belt device containing a seat belt configured to restrain an occupant seating on a vehicle seat;
   an airbag which is provided on the seat belt in a folded state and in which the inside of an upper bag portion for restraining a head communicates with the inside of a lower bag portion for restraining a chest and an abdomen via a communicating portion; and
   an inflator which supplies gas into the lower bag portion when activated, wherein
      the vehicle seat belt device is of three-point type,
      the airbag is provided on a lap belt of the seat belt,
      the communicating portion is provided with a check valve which allows a flow of gas from the inside of the lower bag portion to the inside of the upper bag portion and limits the flow of gas from the inside of the upper bag portion to the inside of the lower bag portion,
      when the lower bag portion is compressed by the chest and the abdomen of the occupant being inclined forward, the upper bag portion is expanded,
      the upper bag portion is expanded behind the lower bag portion being expanded because gas from the inflator is supplied to the upper bag portion through the lower bag portion, and
      the upper bag portion is completely expanded when the lower bag portion is compressed by the chest and the abdomen of the occupant being inclined forward and gas in the lower bag portion is pushed out to the upper bag portion, and then the airbag is completely expanded when the inflator supplies gas to the lower bag portion additionally.

2. The vehicle occupant protection device according to claim 1 further comprising:
   a gas passage that extends from a side of an anchor member, which latches an end portion in a longitudinal direction of the lap belt onto a vehicle body, to the lower bag portion along the lap belt, wherein
   gas from the inflator is supplied to the lower bag portion via the gas passage.

3. The vehicle occupant protection device according to claim 2 wherein
   the gas passage is a flexible tube.

4. The vehicle occupant protection device according to claim 1 wherein
   the upper bag portion is provided with a vent hole for discharging out gas supplied to the inside thereof.

5. The vehicle occupant protection device according to claim 1 wherein
   the airbag includes at least any one of backward projecting portions which are a left and right pair projecting backward of the vehicle from both side portions of the upper bag portion in a vehicle width direction when the upper bag portion is inflated and expanded by gas supplied to the inside thereof, and downward projecting portions which are a left and right pair projecting downward of the vehicle from both side portions of the lower bag portion in the vehicle width direction when the lower bag portion is inflated and expanded by gas supplied to the inside thereof.

6. The vehicle occupant protection device according to claim 1 wherein
the vehicle seat is provided on a vehicle rear seat.

7. The vehicle occupant protection device according to claim 6 wherein
the upper bag portion is provided with a vent hole for discharging out the gas supplied to the inside thereof, and
the vent hole is provided at a portion of the upper bag portion facing outward in the vehicle width direction in an inflation and expansion completion state.

8. The vehicle occupant protection device according to claim 1 further comprising:
a cover through which an intermediate portion in a longitudinal direction of the seat belt is inserted and which is sewed into a cylindrical shape, wherein the airbag is held inside the cover.

9. The vehicle occupant protection device according to claim 1 wherein
a portion on which the airbag is provided of the seat belt is formed into a cylindrical shape, and
the airbag is held inside the cylindrical portion.

10. The vehicle occupant protection device according to claim 1 wherein
the airbag is mounted on a face of the seat belt which is located in front of a waist and directed to an opposite side to the waist under a belt wearing condition.

11. The vehicle occupant protection device according to claim 1 wherein
the airbag is constructed such that the inside thereof is partitioned to the upper bag portion and the lower bag portion with an up-and-down-partitioning cloth, and
the check valve which serves as the communicating portion is attached to the up-and-down-partitioning cloth.

12. The vehicle occupant protection device according to claim 11 wherein
the check valve projects upwardly.

13. The vehicle occupant protection device according to claim 1 wherein
a tether for restricting expansion of a central portion in a width direction of the upper bag portion is attached to the central portion in the width direction inside the upper bag portion.

14. The vehicle occupant protection device according to claim 11 wherein
a communication hole is formed in the up-and-down-partitioning cloth and the check valve allows the flow of gas from the inside of the lower bag portion to the inside of the upper bag portion via the communication hole and limits the flow of gas from the inside of the upper bag portion to the inside of the lower bag portion via the communication hole,
the check valve is formed into a cylindrical shape by attaching an end portion of the check valve in an axial direction to an edge of the communication hole in the up-and-down-partitioning cloth.

* * * * *